United States Patent
Tando

(10) Patent No.: US 12,258,466 B2
(45) Date of Patent: Mar. 25, 2025

(54) FLUORORUBBER COMPOSITION CONTAINING EPOXIDIZED POLYBUTADIENE

(71) Applicant: NIPPON SODA CO., LTD., Tokyo (JP)

(72) Inventor: Izumi Tando, Chiba (JP)

(73) Assignee: NIPPON SODA CO., LTD., Tokyo (JP)

( * ) Notice: Subject to any disclaimer, the term of this patent is extended or adjusted under 35 U.S.C. 154(b) by 673 days.

(21) Appl. No.: 17/440,880

(22) PCT Filed: Mar. 18, 2020

(86) PCT No.: PCT/JP2020/011987
§ 371 (c)(1),
(2) Date: Sep. 20, 2021

(87) PCT Pub. No.: WO2020/196158
PCT Pub. Date: Oct. 1, 2020

(65) Prior Publication Data
US 2022/0162438 A1 May 26, 2022

(30) Foreign Application Priority Data
Mar. 26, 2019 (JP) ................. 2019-059141

(51) Int. Cl.
*C08L 27/16* (2006.01)
*C08L 27/20* (2006.01)
*C08K 3/22* (2006.01)

(52) U.S. Cl.
CPC ............... *C08L 27/16* (2013.01); *C08L 27/20* (2013.01); *C08K 2003/2206* (2013.01); *C08L 2201/08* (2013.01)

(58) Field of Classification Search
CPC ...... C08L 27/16; C08L 27/20; C08L 2201/08; C08L 15/00; C08L 27/12; C08K 2003/2206; C08K 3/011; C08C 19/06
See application file for complete search history.

(56) References Cited

FOREIGN PATENT DOCUMENTS

| | | |
|---|---|---|
| CN | 107785582 | 3/2018 |
| EP | 0788429 B1 | 8/1997 |
| JP | 57-158260 A | 9/1982 |
| JP | S6245645 * | 2/1987 |
| JP | 2006-258932 A | 9/2006 |
| JP | 2011137092 * | 7/2011 |
| JP | 2017-88872 A | 5/2017 |

OTHER PUBLICATIONS

Nikje et al., "Synthesis and characterization of terminally functionalized and epoxidized hydroxyl-terminated polybutadiene", Polym. Bull., Springer, 2012, vol. 68, pp. 973 to 982.
Rajasekar et al. "Development of nitrile butadiene rubber-nanoclay composites with epoxidized natural rubber as compatibilizer", Materials and Design vol. 30, 2009, pp. 3839 to 3845.
Database CA: Chemical Abstracts Service; "Heat stabilizers for halogen-containing polymers and paraffins"; Database accession No. 1983:90502; includes abstract and chemical formula of JP S57 158260 A (1980).
Database WPI: week 198245, Thomson Scientific; AN 1982-95867E; includes abstract of JP S57 158260 A (1980).

* cited by examiner

*Primary Examiner* — Kumar R Bhushan
(74) *Attorney, Agent, or Firm* — GREENBLUM & BERNSTEIN, P.L.C.

(57) ABSTRACT

A fluororubber composition contains 0.1 to 50 parts by weight of an epoxidized polybutadiene with respect to 100 parts by weight of a fluororubber. As the fluororubber, a vinylidene fluoride-hexafluoropropylene copolymer (FKM), a tetrafluoroethylene-propylene-based copolymer (FEPM), a tetrafluoroethylene-perfluoroalkyl vinyl ether-based copolymer (FFKM), or the like is exemplified. The fluororubber composition may further contain a vulcanizing agent or the like.

10 Claims, No Drawings

FLUORORUBBER COMPOSITION CONTAINING EPOXIDIZED POLYBUTADIENE

TECHNICAL FIELD

The present invention relates to a fluororubber composition containing an epoxidized polybutadiene.

Priority is claimed on Japanese Patent Application No. 2019-59141, filed on Mar. 26, 2019, the content of which is incorporated herein by reference.

BACKGROUND ART

Fluororubber is excellent in terms of heat resistance, chemical resistance, oil resistance, weather resistance, and the like and is thus used in a variety of applications such as automobile part materials or electronic component materials. In vulcanizing a fluororubber, it is common to blend an acid acceptor thereinto in order to neutralize hydrofluoric acid being generated.

Patent document 1 proposes a heat stabilizer for a halogen-containing polymer in which an epoxidized liquid-phase polybutadiene is contained as an active component. In addition, patent document 2 proposes a chlorosulfonated polyolefin composition in which 3 to 50 parts by weight of an aliphatic glycidyl ether, an epoxidized polybutadiene, or an epoxidized oil is contained with respect to 100 parts by weight of a chlorosulfonated polyolefin.

PRIOR ART DOCUMENTS

Patent Documents

[Patent document 1] Japanese unexamined Patent Application Publication No. 57-158260
[Patent document 2] Japanese unexamined Patent Application Publication No. 2017-88872

SUMMARY OF THE INVENTION

Object to be Solved by the Invention

For lead monoxide that has been thus far used as an acid acceptor for halogenated rubber, the toxicity has been concerned in some cases. Therefore, in recent years, magnesium oxide or the like has been used as an acid acceptor. However, when magnesium oxide is blended into a fluororubber, there has been a problem in that water resistance or acid resistance deteriorates. Therefore, there has been a desire for a novel fluororubber composition that is excellent in terms of water resistance or acid resistance and is highly safe.

Means to Solve the Object

As a result of repeating intensive studies for solving the above-described object, the present inventors found a fluororubber composition containing 0.1 to 50 parts by weight of an epoxidized polybutadiene with respect to 100 parts by weight of a fluororubber and completed the present invention.

More specifically, the present invention relates to inventions below.

(1) A fluororubber composition, comprising 0.1 to 50 parts by weight of an epoxidized polybutadiene with respect to 100 parts by weight of a fluororubber.

(2) The fluororubber composition according to (1), in which the fluororubber is at least one copolymer selected from a vinylidene fluoride-hexafluoropropylene copolymer (FKM), a tetrafluoroethylene-propylene-based copolymer (FEPM), and a tetrafluoroethylene-perfluoroalkyl vinyl ether-based copolymer (FFKM).

(3) The fluororubber composition according to (1) or (2), further comprising a vulcanizing agent.

(4) The fluororubber composition according to any one of (1) to (3), in which the epoxidized polybutadiene is an epoxidized polybutadiene consisting of repeating units of formula (I), formula (II), formula (III), and formula (IV).

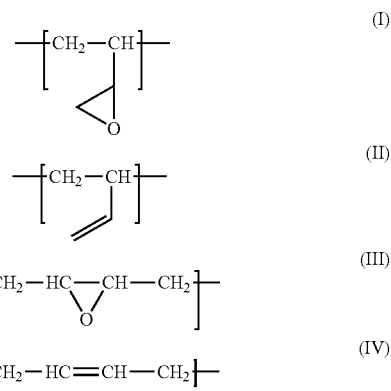

(5) The fluororubber composition according to (4), in which a total proportion of the repeating units of formula (I) and formula (II) in all the repeating units of the epoxidized polybutadiene is 75 to 99 mol %.

(6) The fluororubber composition according to (4) or (5), in which a total proportion of the repeating units of formula (I) and formula (III) in all the repeating units of the epoxidized polybutadiene is 1 to 90 mol %.

(7) The fluororubber composition according to (6), in which the total proportion of the repeating units of formula (I) and formula (III) in all the repeating units of the epoxidized polybutadiene is 1 to 40 mol %.

(8) The fluororubber composition according to any one of (1) to (7), in which a number-average molecular weight (Mn) of the epoxidized polybutadiene is 500 to 10,000.

(9) A molded product made by molding the fluororubber composition according to any one of (1) to (8).

Effect of the Invention

The fluororubber composition of the present invention is excellent in terms of water resistance or acid resistance and is also highly safe.

Mode of Carrying Out the Invention

A fluororubber composition of the present invention contains a fluororubber and an epoxidized polybutadiene. The content of the epoxidized polybutadiene in the fluororubber composition is not particularly limited, but the content of the epoxidized polybutadiene may be 0.1 to 50 parts by weight, 0.1 to 40 parts by weight, 0.1 to 30 parts by weight, 0.1 to 20 parts by weight, 0.1 to 10 parts by weight, or 1 to 10 parts by weight with respect to 100 parts by weight of the fluororubber. In the fluororubber composition, the epoxidized polybutadiene functions as an acid acceptor, but may exhibit other functions.

The fluororubber that is contained in the fluororubber composition of the present invention is not particularly limited as long as the fluororubber is a rubber having a fluorine atom in the molecule. As the fluororubber, specifically, a vinylidene fluoride-hexafluoropropylene copolymer (FKM), a tetrafluoroethylene-propylene-based copolymer (FEPM), a tetrafluoroethylene-perfluoroalkyl vinyl ether-based copolymer (FFKM), or the like may be exemplified. These fluororubbers may be used alone or used by combination of two or more thereof. As the fluororubber, a commercially available product may be used.

The epoxidized polybutadiene that is contained in the fluororubber composition of the present invention is not particularly limited as long as the epoxidized polybutadiene is an epoxy-modified polybutadiene. The epoxidized polybutadiene may be a polybutadiene in which a polymer chain terminal is epoxy-modified or may be a polybutadiene in which a double bond of a main chain is epoxidized. An epoxy group in the epoxidized polybutadiene reacts with hydrogen fluoride and thereby functions as an acid acceptor.

As the epoxidized polybutadiene in which a double bond of a main chain is epoxidized, an epoxidized polybutadiene consisting of repeating units of formula (I), formula (II), formula (III), and formula (IV) may be exemplified. The total proportion of the repeating units of formula (I) and formula (II) in all the repeating units of the epoxidized polybutadiene is preferably 75 to 99 mol %. In addition, as the total proportion of the repeating units of formula (I) and formula (III) in all the repeating units of the epoxidized polybutadiene, a range of 1 to 90 mol %, 1 to 80 mol %, 1 to 70 mol %, 1 to 60 mol %, 1 to 50 mol %, 1 to 40 mol %, 5 to 40 mol %, 10 to 40 mol %, or the like may be selected.

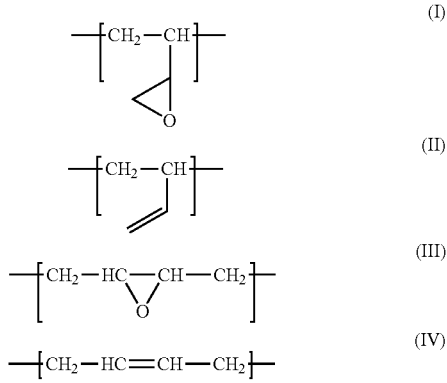

The molecular weight of the epoxidized polybutadiene is not particularly limited, but the number-average molecular weight (Mn) is preferably 500 to 10,000. It should be noted that the weight-average molecular weight and the number-average molecular weight are each a value obtained by converting data measured by gel permeation chromatography (GPC), in which tetrahydrofuran is used as a solvent, based on the molecular weight of the standard polystyrene.

As the epoxidized polybutadiene, a commercially available product may be used. As the commercially available product of the epoxidized polybutadiene, NISSO-PB (registered trademark) JP-100 (manufactured by Nippon Soda Co., Ltd.), NISSO-PB (registered trademark) JP-200 (manufactured by Nippon Soda Co., Ltd.), EPOLEAD (registered trademark) PB3600 (manufactured by Daicel Corporation), 4700 (manufactured by Daicel Corporation), ADK CIZER (registered trademark) BF-1000 (manufactured by ADEKA Corporation), Ricon 657 (manufactured by Clay Valley), or the like may be exemplified. These epoxidized polybutadienes may be used alone or used by combination of two or more thereof. Among the above-described epoxidized polybutadienes, NISSO-PB (registered trademark) JP-100 (manufactured by Nippon Soda Co., Ltd.) and NISSO-PB (registered trademark) JP-200 (manufactured by Nippon Soda Co., Ltd.) are preferable.

A method for producing the fluororubber composition of the present invention is not particularly limited. For example, a method in which an epoxidized polybutadiene is added to a fluororubber and then kneaded with a kneading machine may be exemplified.

The fluororubber composition of the present invention may contain different components other than the fluororubber and the epoxidized polybutadiene. As the different components, a plasticizer, a filler, a reinforcing agent, an anti-aging agent, a lubricant, a processing aid, a vulcanizing agent, a vulcanization accelerator, or the like may be exemplified.

As the plasticizer, a phthalic acid derivative, a phosphoric acid derivative, a sebacic acid derivative, pentaerythritol, a low-molecular-weight fluororubber, or the like may be exemplified. More specifically, dialkyl phthalate, dialkyl sebacate, pentaerythritol, or the like may be exemplified.

As the filler, a metal oxide such as titanium oxide, aluminum oxide, or zinc oxide, a metal hydroxide such as magnesium hydroxide or aluminum hydroxide, a carbonate such as magnesium carbonate, aluminum carbonate, calcium carbonate, or barium carbonate, a silicate such as magnesium silicate, calcium silicate, or aluminum silicate, a sulfate such as aluminum sulfate, calcium sulfate, or barium sulfate, a metal sulfide such as molybdenum disulfide, iron sulfide, or copper sulfide, diatomaceous earth, asbestos, lithopone (zinc sulfide/barium sulfide), graphite, carbon black, carbon fluoride, calcium fluoride, coke, fine quartz powder, zinc flower, talc, mica powder, wollastonite, a carbon fiber, an aramid fiber, a variety of whiskers, a glass fiber, an organic reinforcing agent, an organic filler, a fluorine-containing thermoplastic resin such as polytetrafluoroethylene, mica, silica, cerite, clay, or the like may be exemplified.

As the reinforcing agent, carbon black, kaolin clay, talc, mica, calcium carbonate, silica, or the like may be exemplified.

As the anti-aging agent, an aromatic secondary amine-based anti-aging agent, an amine-ketone-based anti-aging agent, a mercaptobenzoimidazole-based anti-aging agent, a bisphenol-based anti-aging agent, a monophenol-based anti-aging agent, a thiobisphenol-based anti-aging agent, a hydroquinone-based anti-aging agent, a nickel salt-based anti-aging agent, a thiourea-based anti-aging agent, a thioether-based anti-aging agent, and a phosphorus-based anti-aging agent may be exemplified.

As the lubricant, a polyglycerin fatty acid ester, a phosphoric acid ester, a fatty acid ester, a fatty acid amide, a higher fatty acid, or the like may be exemplified.

As the processing aid, a higher fatty acid such as stearic acid, oleic acid, palmitic acid, or lauric acid, a higher fatty acid salt such as sodium stearate or zinc stearate, an aliphatic alcohol, a polyglycol such as ethylene glycol, glycerin, or diethylene glycol, an aliphatic amine such as stearylamine, a silicone-based oil, a silicone-based polymer, a low-molecular-weight polyethylene, phosphate esters, a rosin, a (halogenated) dialkylamine, a surfactant, a sulfone compound, a fluorine-based aid, an organic amine compound, or the like may be exemplified.

As the vulcanizing agent, a polyol-based vulcanizing agent of a polyhydroxy aromatic compound such as 2,2-bis (4-hydroxyphenyl)propane [bisphenol A], 2,2-bis(4-hydroxyphenyl)hexafluoropropane, 2,2-bis(4-hydroxyphenyl) perfluoropropane [bisphenol AF], hydroquinone, catechol, resorcin, 4,4'-dihydroxydiphenyl, 4,4'-dihydroxydiphenylmethane, 4,4'-dihydroxydiphenylsulfone, 2,2-bis(4-hydroxyphenyl)butane or an alkali metal salt or alkaline earth metal salt thereof may be exemplified.

As the vulcanization accelerator, calcium hydroxide, a quaternary ammonium salt such as N-8-benzyl-1,8-diazabicyclo[5.4.0]undec-7-ene ammonium chloride, a quaternary phosphonium salt, or the like may be exemplified.

The fluororubber composition of the present invention may be molded by an ordinary fluororubber molding method.

EXAMPLES

Hereinafter, the present invention will be described in more detail using examples, but the present invention is not limited to the scope of the examples.

Substances used in the examples and comparative examples are shown in Table 1.

TABLE 1

|  |  | Product name | Producer |
|---|---|---|---|
| Acid acceptor | Epoxidized-polybutadiene A | NISSO-PB JP-100 | Nippon Soda Co., Ltd. |
|  | Epoxidized polybutadiene B*[1] | — | — |
|  | Magnesium oxide | KYOWAMAG (registered trademark) #150 | Kyowa Chemical Industry Co., Ltd. |
|  | Lead monoxide | Lead (II) oxide reagent special grade | Hiroshima Wako Co., Ltd. |
| Fluororubber | FKM | G-701 | DAIKIN Industries, Ltd. |
| Vulcanization accelerator | Calcium hydroxide | CALDIC#1000 | Ohmi Chemical Industry Co., Ltd. |
| Reinforcing agent | Carbon black | THERMAX N990 | Cancarb Inc. |

*[1]Epoxidized polybutadiene produced in Production Example 1

Production Example 1

With reference to "Synthesis of Polymers (I)" edited by Takeshi Endo, 1$^{st}$ edition, Kodansha Ltd., 2010, 1,4-polybutadiene (1,4-PB) was synthesized using an alkali metal as an initiator. Mn was approximately 2000, and the 1,2-vinyl rate was approximately 20%. The obtained 1,4-PB was epoxidized using the method described in Japanese unexamined Patent Application Publication No. 51-36448, and epoxidized 1,4-PB having an epoxy equivalent of approximately 230 was obtained.

Example 1

FKM (100 parts by weight), an epoxidized polybutadiene A (3 parts by weight), calcium hydroxide (6 parts by weight), and carbon black (20 parts by weight) were kneaded with a mill, thereby obtaining a fluororubber composition. The obtained fluororubber composition was press-vulcanized at 170° C. for 12 minutes and further heated in an oven at 230° C. for 24 hours for secondary vulcanization, thereby obtaining a vulcanizate. The obtained vulcanizate was subjected to a tensile test, a tearing test, a water resistance test, a chlorine resistance test, and an acid resistance test. The results of these tests are shown in Table 2.

Example 2

A vulcanizate was obtained in the same manner as in Example 1 except that an epoxidized polybutadiene B (3 parts by weight) was used instead of the epoxidized polybutadiene A. The obtained vulcanizate was subjected to a tensile test, a tearing test, a water resistance test, a chlorine resistance test, and an acid resistance test. The results of these tests are shown in Table 2.

Comparative Example 1

A vulcanizate was obtained in the same manner as in Example 1 except that magnesium oxide (3 parts by weight) was used instead of the epoxidized polybutadiene A and the resulting fluororubber composition was press-vulcanized at 170° C. for 15 minutes. The obtained vulcanizate was subjected to a tensile test, a tearing test, a water resistance test, a chlorine resistance test, and an acid resistance test. The results of these tests are shown in Table 3.

Comparative Example 2

A vulcanizate was obtained in the same manner as in Example 1 except that lead monoxide (5 parts by weight) was used instead of the epoxidized polybutadiene A and the resulting fluororubber composition was press-vulcanized at 170° C. for 15 minutes. The obtained vulcanizate was subjected to a tensile test, a tearing test, a water resistance test, a chlorine resistance test, and an acid resistance test. The results of these tests are shown in Table 3.

Testing Methods

"Tensile Test"

The tensile strength and the elongation at breaking were measured based on JIS K 6251: 2010 "Rubber, vulcanized or thermoplastics-Determination of tensile stress-strain properties".

"Tearing Test"

The tearing strength was measured based on JIS K 6252: 2007 "Rubber, vulcanized or thermoplastic-Determination of tear strength".

"Water Resistance and Acid Resistance Tests"

The volume changes after immersing the vulcanizate in water, 600 ppm chlorinated water, 10% nitric acid, and 20% hydrochloric acid at 80° C. for 168 hours were measured based on JIS K 6258: 2010 "Rubber, vulcanized or thermoplastic-Determination of the effect of liquids".

TABLE 2

|  | Example 1 | Example 2 |
|---|---|---|
| Epoxidized polybutadiene A | 3 |  |
| Epoxidized polybutadiene B |  | 3 |
| FKM | 100 | 100 |
| Carbon black | 20 | 20 |
| Calcium hydroxide | 6 | 6 |

TABLE 2-continued

|  |  |  | Example 1 | Example 2 |
|---|---|---|---|---|
| Tensile test | Tensile strength | MPa | 15.6 | 13.3 |
|  | Elongation at breaking | % | 210 | 180 |
|  | M100 | MPa | 7.46 | 7.13 |
|  | M200 | MPa | 15.3 | — |
| Tearing test | Tearing strength | N/mm | 24.3 | 24.7 |
| Pure water immersion test (80° C. × 168 h) | Volume change | % | 3 | 3 |
| 600 ppm Chlorinated water immersion test | Volume change | % | 5 | 4 |
| 10% Nitric acid immersion test | Volume change | % | 11 | 11 |
| 20% hydrochloric acid immersion test | Volume change | % | 11 | 10 |

TABLE 3

|  |  |  | Comparative Example 1 | Comparative Example 2 |
|---|---|---|---|---|
| Magnesium oxide |  |  | 3 |  |
| Lead monoxide |  |  |  | 5 |
| FKM |  |  | 100 | 100 |
| Carbon black |  |  | 20 | 20 |
| Calcium hydroxide |  |  | 6 | 6 |
| Tensile test | Tensile strength | MPa | 15.6 | 13.7 |
|  | Elongation at breaking | % | 210 | 230 |
|  | M100 | MPa | 5.45 | 5.62 |
|  | M200 | MPa | 14.5 | 12.2 |
| Tearing test | Tearing strength | N/mm | 25.2 | 23.9 |
| Pure water immersion test (80° C. × 168 h) | Volume change | % | 2 | 1 |
| 600 ppm Chlorinated water immersion test | Volume change | % | 12 | 8 |
| 10% Nitric acid immersion test | Volume change | % | 55 | 16 |
| 20% hydrochloric acid immersion test | Volume change | % | 24 | 8 |

The invention claimed is:

1. A fluororubber composition, consisting essentially of 0.1 to 50 parts by weight of an epoxidized polybutadiene with respect to 100 parts by weight of a fluororubber.

2. The fluororubber composition according to claim 1, wherein the fluororubber is at least one copolymer selected from a vinylidene fluoride-hexafluoropropylene copolymer (FKM), a tetrafluoroethylene-propylene-based copolymer (FEPM), and a tetrafluoroethylene-perfluoroalkyl vinyl ether-based copolymer (FFKM).

3. The fluororubber composition according to claim 1, further comprising a vulcanizing agent.

4. The fluororubber composition according to claim 1, wherein the epoxidized polybutadiene is an epoxidized polybutadiene consisting of repeating units of formula (I), formula (II), formula (III), and formula (IV)

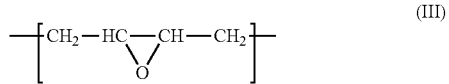

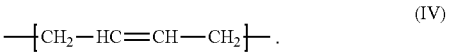

5. The fluororubber composition according to claim 4, wherein a total proportion of the repeating units of formula (I) and formula (II) in all the repeating units of the epoxidized polybutadiene is 75 to 99 mol %.

6. The fluororubber composition according to claim 4, wherein a total proportion of the repeating units of formula (I) and formula (III) in all repeating units of the epoxidized polybutadiene is 1 to 90 mol %.

7. The fluororubber composition according to claim 6, wherein the total proportion of the repeating units of formula (I) and formula (III) in all repeating units of the epoxidized polybutadiene is 1 to 40 mol %.

8. The fluororubber composition according to claim 1, wherein a number-average molecular weight (Mn) of the epoxidized polybutadiene is 500 to 10,000.

9. A molded product made by molding the fluororubber composition according to claim 1.

10. A fluororubber composition, consisting of 0.1 to 50 parts by weight of an epoxidized polybutadiene with respect to 100 parts by weight of a fluororubber, and optionally, one or more components selected from the group consisting of a plasticizer, a filler, a reinforcing agent, an anti-aging agent, a lubricant, a processing aid, a vulcanizing agent, and a vulcanization accelerator.

* * * * *